United States Patent
Huq et al.

(10) Patent No.: US 12,267,344 B1
(45) Date of Patent: Apr. 1, 2025

(54) IDENTIFYING SIMILAR GEOGRAPHICALLY PROXIMATE INFRASTRUCTURES FROM A KNOWN NETWORK ADDRESS

(71) Applicant: Trend Micro Incorporated, Tokyo (JP)

(72) Inventors: Numaan Mehryar Huq, Toronto (CA); Roel Sotto Reyes, Rizal (PH); Morton Gregory Swimmer, Wedel (DE); Vincenzo Ciancaglini, Paca (FR)

(73) Assignee: Trend Micro Incorporated, Tokyo (JP)

( * ) Notice: Subject to any disclaimer, the term of this patent is extended or adjusted under 35 U.S.C. 154(b) by 309 days.

(21) Appl. No.: 18/102,026

(22) Filed: Jan. 26, 2023

(51) Int. Cl.
H04L 9/40 (2022.01)

(52) U.S. Cl.
CPC .............................. H04L 63/1425 (2013.01)

(58) Field of Classification Search
CPC . H04L 63/1433; H04L 63/20; H04L 63/1408; H04L 63/1416; H04L 63/1425; G06F 21/577; G06F 2221/034; G06F 21/56
See application file for complete search history.

(56) References Cited

U.S. PATENT DOCUMENTS

| | | | |
|---|---|---|---|
| 10,855,700 B1* | 12/2020 | Jeyaraman | H04L 63/1425 |
| 11,240,275 B1* | 2/2022 | Vashisht | H04L 63/145 |
| 2018/0343309 A1* | 11/2018 | Mishra | H04L 63/0861 |
| 2020/0195671 A1* | 6/2020 | Engan | H04L 63/1425 |
| 2021/0034753 A1* | 2/2021 | Canada | G06F 18/217 |
| 2021/0110319 A1* | 4/2021 | Gourisetti | G06Q 10/0637 |
| 2022/0385678 A1* | 12/2022 | Bobak | H04L 41/22 |
| 2023/0208857 A1* | 6/2023 | Medvedovsky | H04L 63/1458 726/13 |
| 2023/0224276 A1* | 7/2023 | Chen | H04L 63/0823 726/11 |

(Continued)

OTHER PUBLICATIONS

Gelenbe et al., "Traffic Based Sequential Learning During Botnet Attacks to Identify Compromised IoT Devices," IEEE Access Year: 2022 | vol. 10 | Journal Article | Publisher: IEEE.*

(Continued)

*Primary Examiner* — Roderick Tolentino
(74) *Attorney, Agent, or Firm* — Beyer Law Group LLP

(57) ABSTRACT

Similar geographically proximate infrastructures are identified from a received compromised Internet protocol (IP) address of a compromised infrastructure. The geographic location of the compromised infrastructure is determined from the compromised IP address. The geographic locations of other infrastructures are determined from their respective exposed IP addresses. Geographically proximate infrastructures are identified from among the other infrastructures, with the geographically proximate infrastructures having geographic locations that are within a predetermined distance of the geographic location of the compromised infrastructure. Similar geographically proximate infrastructures are identified from among the geographically proximate infrastructures, with the similar geographically proximate infrastructures having a same industrial purpose as the compromised infrastructure.

19 Claims, 4 Drawing Sheets

(56) References Cited

U.S. PATENT DOCUMENTS

2023/0336581 A1* 10/2023 Dunn .................... G06F 21/577
2024/0340303 A1* 10/2024 Krakover ................ H04L 63/20

OTHER PUBLICATIONS

Turner et al., "Ransomware-Bitcoin Threat Intelligence Sharing Using Structured Threat Information Expression," IEEE Security & Privacy Year: 2023 | vol. 21, Issue: 3 | Magazine Article | Publisher: IEEE.*

* cited by examiner

IDENTIFYING SIMILAR GEOGRAPHICALLY PROXIMATE INFRASTRUCTURES FROM A KNOWN NETWORK ADDRESS

TECHNICAL FIELD

The present disclosure is directed to cybersecurity.

BACKGROUND

Critical infrastructures include assets, systems, and networks that are vital to public health, safety, and/or security. Critical infrastructures include infrastructures for water treatment, power generation, telecommunication, etc. Today's infrastructures have devices that can communicate over a public network, such as the Internet. More particularly, infrastructures may have industrial control systems (ICS), supervisory control and data acquisition systems (SCADA), and other devices that are accessible from the Internet either by design or by mistake. Because these infrastructures have exposed Internet protocol (IP) addresses, they are susceptible to cyberattacks, such as denial of service (DoS), unauthorized intrusion, hacking, etc. While most cyberattacks have economic consequences, cyberattacks are catastrophic to critical infrastructures. For example, a cyberattack on a power generation plant can render an entire city without electricity.

BRIEF SUMMARY

In one embodiment, similar geographically proximate infrastructures are identified from a received compromised IP address of a compromised infrastructure. The geographic location of the compromised infrastructure is determined from the compromised IP address. The geographic locations of other infrastructures are determined from their respective exposed IP addresses. Geographically proximate infrastructures are identified from among the other infrastructures, with the geographically proximate infrastructures having geographic locations that are within a predetermined distance of the geographic location of the compromised infrastructure. Similar geographically proximate infrastructures are identified from among the geographically proximate infrastructures, with the similar geographically proximate infrastructures having a same industrial purpose as the compromised infrastructure. The similar geographically proximate infrastructures may be identified based on comparisons of network fingerprints and/or satellite images.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
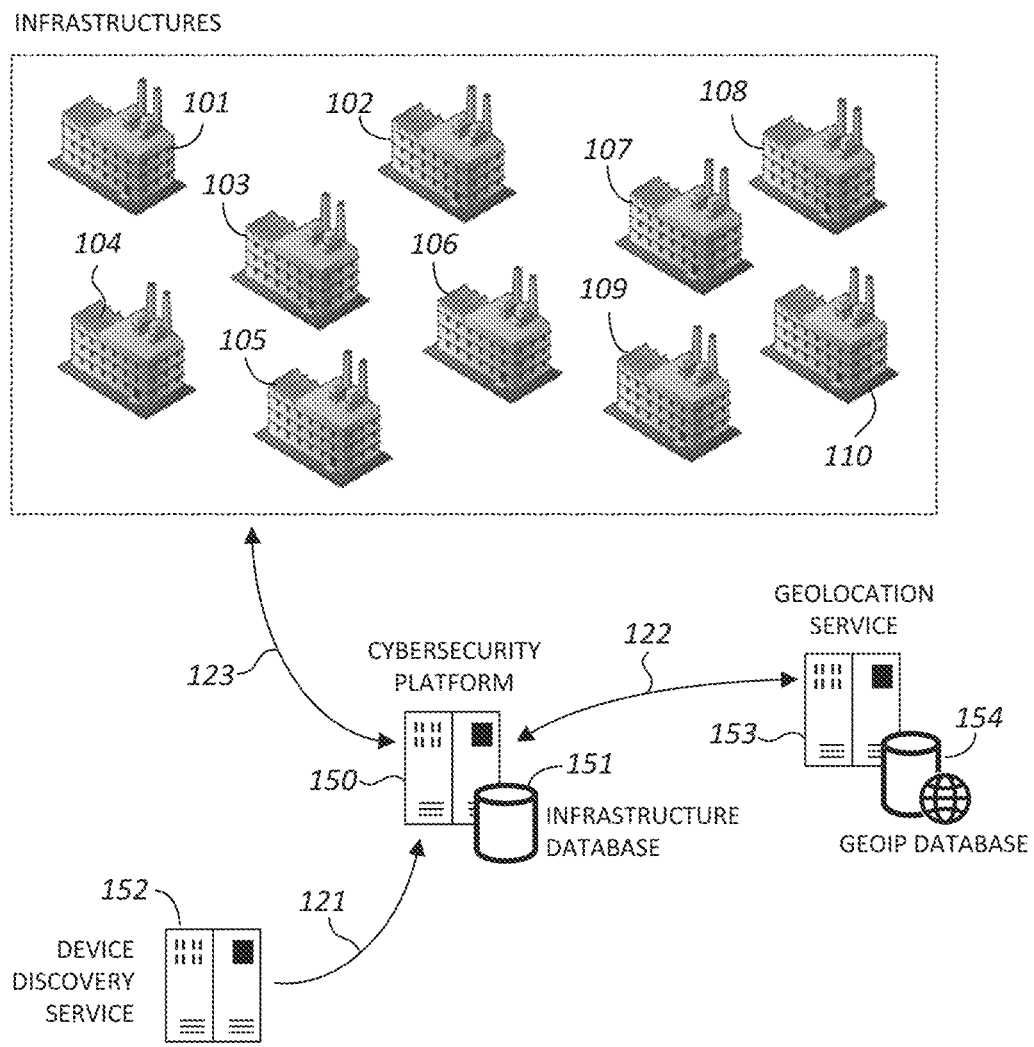
FIG. 1 shows a block diagram of a system for identifying similar geographically proximate infrastructures in accordance with an embodiment of the present invention.

FIG. 1 shows a block diagram of a system for identifying similar geographically proximate infrastructures in accordance with an embodiment of the present invention. In the example of FIG. 1, the system includes a cybersecurity platform 150, a device discovery service 152, and a geolocation service 153, all of which may communicate over the Internet.

The system of FIG. 1 is shown as operating with only ten infrastructures (labeled as 101-110) for illustration purposes. As can be appreciated, the system of FIG. 1 may operate with many infrastructures across the world. The infrastructures may have different industrial purposes, i.e., used in industries with infrastructures that have distinctive outdoor features, such as outdoor machinery, equipment, and structures that are indicative of the industry. For example, the infrastructures may be for water treatment, electrical power generation, solar power generation, etc.

The device discovery service 152 may comprise computer hardware and software for scanning the Internet to discover exposed IP addresses of infrastructures. The exposed IP addresses are those of public-facing (i.e., accessible from the Internet) devices of the infrastructure. Examples of these devices include ICS and SCADA devices, routers, web cams, server computers, and other computing devices. The device discovery service 152 may be that of the Shodan device search engine, Censys device search engine, or other suitable device search engine. The cybersecurity platform 150 may receive the discovered exposed IP addresses from the device discovery service 152 (see arrow 121).

The geolocation service 153 may comprise hardware and software for providing a mapping of IP addresses to geographic locations. That is, given an IP address, the geolocation service 153 provides the geographic location (e.g., by latitude/longitude) of the IP address, i.e., the geographic location of the infrastructure with the IP address. The mapping between IP addresses and respective geographic locations may be available from a Geo IP database 154 of the geolocation service 153. The geolocation service 153 may be that of the Maxmind service, for example. Other suitable geolocation services may also be employed. The cybersecurity platform 150 may consult the geolocation service 153 (see arrow 122) to determine the geographic location of an IP address.

In the example of FIG. 1, the device discovery service 152 and the geolocation service 153 are depicted as being separate from the cybersecurity platform 150. As can be appreciated, the device discovery service 152, the geolocation service 153, and the cybersecurity platform 150 may also be integrated together and/or offered as part of the same service provided by a cybersecurity vendor.

The cybersecurity platform 150 may comprise computer hardware and software for identifying similar geographically proximate infrastructures. Geographically proximate infrastructures are infrastructures that are geographically located within a predetermined distance of each other. The predetermined distance depends on the particular cybersecurity application. The cybersecurity platform 150 may be employed to receive a network address, which in one embodiment is an IP address, of a compromised infrastructure. An infrastructure is compromised if it has been cyberattacked or is vulnerable to being cyberattacked.

The cybersecurity platform 150 may be employed to identify, from the IP address of the compromised infrastructure, infrastructures that are geographically proximate and similar to the compromised infrastructure. Identifying similar geographically proximate infrastructures advantageously allows for detection of an extended cyberattack that targets a specific industry. More particularly, when an infrastructure has been compromised by a cyberattack, it is important to know whether the cyberattack is isolated or is part of a campaign that targets other infrastructures having the same industrial purpose and within the same general geographic location. Embodiments of the present invention allow Security Operation Teams (SOC) and other information technology (IT) personnel of the similar geographically proximate infrastructures to be warned of, and thus become better prepared for, the extended cyberattack.

The cybersecurity platform 150 may receive an alert regarding a compromised IP address (i.e., IP address of a compromised infrastructure) from a feed provided by a cybersecurity vendor, cybersecurity organization, user feedback, etc. In one embodiment, the cybersecurity platform 150 is part of the same service or computer system of a cybersecurity vendor, such as Trend Micro Incorporated. This allows the cybersecurity platform 150 to receive compromised IP addresses in a timely manner, thereby allowing different customers of the cybersecurity vendor to be alerted regarding a possible cyberattack that targets a particular industry.

The cybersecurity platform 150 may store IP addresses, network fingerprints, satellite images, and other infrastructure-related data in an infrastructure database 151. In one embodiment, the infrastructure database 151 is a geo-enabled database (e.g., with Elasticsearch engine). The geographic location and IP address of an infrastructure is also referred to herein as a "location-IP address" pair. The infrastructure database 151 may be periodically populated with location-IP address pairs, using data from the device discovery service 152 and the geolocation service 153.

The cybersecurity platform 150 may be employed to identify similar infrastructures based at least on their satellite images and/or network characteristics (e.g., network services running on open ports). A satellite image of an infrastructure depicts buildings, facilities, equipment, machinery, and/or other structural features that can be seen from outside the infrastructure. As can be appreciated, satellite images of some infrastructures (e.g., critical infrastructures) have distinguishing structural features because of their industrial purpose. These distinguishing structural features, such as photovoltaic modules of a solar farm, windmills of a wind energy facility, transformers of power generation plants, smokestacks used in particular industries, etc., can be identified in satellite images. Satellite images of infrastructures may be compared to identify similar infrastructures by using machine learning or geospatial analytics, such as that provided by Descartes Labs geospatial analysis service.

In one embodiment, the cybersecurity platform 150 is employed to use IP addresses of infrastructures to scan the infrastructures for open network ports ("ports"), identify network services that are running on the open ports, generate network fingerprints of the infrastructures based at least on which network service runs on which open port, and obtain satellite images of the infrastructures. The cybersecurity platform 150 may be employed to compare the network fingerprints and satellite images to identify similar infrastructures, which in one embodiment are infrastructures that have similar network fingerprints and/or satellite images.

Figure 2:
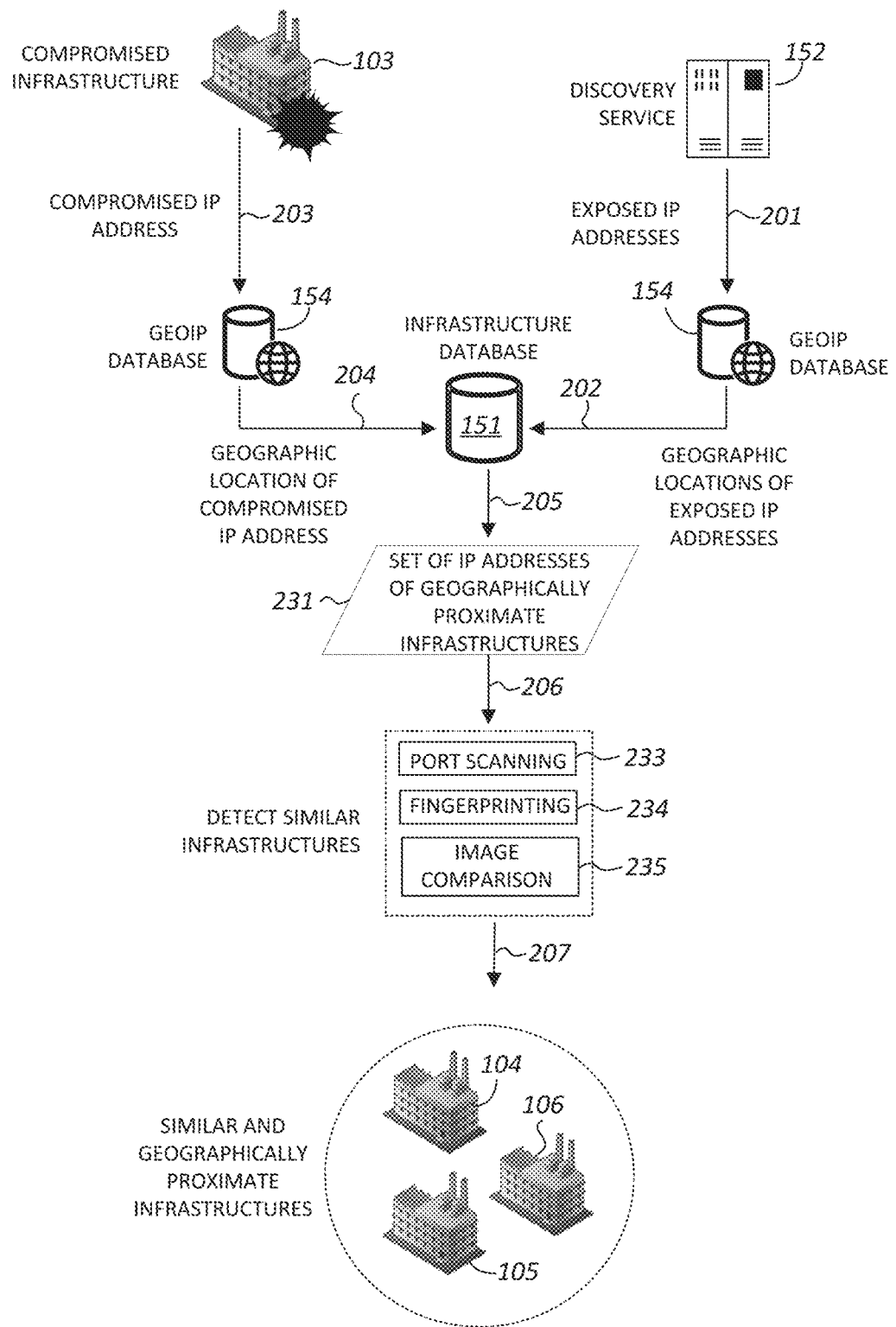
FIG. 2 shows a flow diagram of a method of identifying similar geographically proximate infrastructures in accordance with an embodiment of the present invention.

FIG. 2 shows a flow diagram of a method of identifying similar geographically proximate infrastructures in accordance with an embodiment of the present invention. The method of FIG. 2 may be performed using the cybersecurity platform 150. As can be appreciated, other computer systems or components may also be employed without detracting from the merits of the present invention In the example of FIG. 2, the device discovery service 152 scans the Internet to discover exposed IP addresses of infrastructures (arrow 201). The Geo IP database 154 is consulted to get the geographic locations of the exposed IP addresses (arrow 202). That is, given an exposed IP address, the Geo IP database 154 provides a geographic location of the infrastructure with the exposed IP address. The location-IP address pairs of infrastructures are stored in the infrastructure database 151.

In the example of FIG. 2, the infrastructure 103 has been compromised by a cyberattack. An alert regarding the cyberattack on the compromised infrastructure 103 is received in the cybersecurity platform 150. The alert includes the compromised IP address of the compromised infrastructure 103 (arrow 203). The Geo IP database 154 is consulted to get the geographic location of the compromised IP address (arrow 204), i.e., the geographic location of the compromised infrastructure 103. The location-IP address pair of the compromised infrastructure 103 is stored in the infrastructure database 151.

A geographic proximity query is issued to the infrastructure database 151 to find infrastructures that are geographically proximate to the compromised infrastructure 103. The IP addresses of infrastructures that are found to be geographically proximate to the compromised infrastructure 103 are included in a set 231 of geographically proximate IP addresses (arrow 205). Infrastructures having IP addresses in the set 231 are also referred to herein as being in the set 231.

In one embodiment, a port scanning step 233, a network fingerprinting step 234, and an image comparison step 235 (arrow 206) are performed on the compromised infrastructure 103 and infrastructures in the set 231. The network fingerprint and satellite image of the infrastructure 103 may be compared to the network fingerprints and satellite images of infrastructures in the set 231 to identity infrastructures that are similar and geographically proximate to the compromised infrastructure 103.

The port scanning step 233 includes scanning network ports of an infrastructure to detect open ports and network services running on the open ports. A network service is an application program that communicates using one or more ports. A network service may employ a particular communication protocol. Port scanning may be performed by interrogating ports associated with an IP address to detect open ports, and communicating with an open port using different communication protocols to identify the network service that is running on the open port. Conventional port scanning algorithms may be employed to identify open ports and network services running on the open ports.

Some network services are expected to be running on certain ports. For example, Simple Mail Transfer Protocol (SMTP) typically runs on port number 25. As another example, Hypertext Transfer Protocol (HTTP) typically runs on port number 80. A port and associated network service running on the port is also referred to herein as a "port-service pair". Similar infrastructures have similar port-service pairs because their industrial purpose typically requires using the same devices that are configured the same way. For example, infrastructures of the same industry that use ICS and SCADA devices typically have predefined port-service pairs.

The network fingerprinting step 234 includes generating a network fingerprint of an infrastructure based on the port-service pairs of the infrastructure. A network fingerprint may comprise a plurality of port-service pairs, such as (Port_1, Service_1), (Port_2, Service_2), . . . , (Port_n, Service_n)

where (Port_1, Service_1) is a port-service pair, (Port_2, Service_2) is another port-service pair, etc. Two network fingerprints may be deemed to be similar when the number of port-service pairs that are common in both network fingerprints is equal to or greater than a predetermined threshold number.

The network fingerprinting step 234 may further include port knocking, which involves connecting to a port to retrieve an initial header to detect additional information about a network service when possible. As a particular example, HTTP headers may be retrieved from port number 80 by port knocking. The retrieved HTTP headers may be examined for information that indicates whether the infrastructure is compromised or susceptible to being compromised. Additional network service information obtained by port knocking may be included as part of a network fingerprint or in evaluation of an infrastructure.

Infrastructures that are similar to the compromised structure 103 may be found based at least on network characteristics of the compromised structure 103. More particularly, infrastructures in the set 231 with network fingerprints that are similar to the network fingerprint of the compromised infrastructure 103 may be deemed to be similar to the compromised infrastructure 103.

The image comparison step 235 includes receiving satellite images of the compromised infrastructure 103 and infrastructures in the set 231, and comparing the satellite images to find infrastructures in the set 231 that are similar to the compromised infrastructure 103. More particularly, infrastructures in the set 231 with satellite images that are similar to the satellite image of the compromised infrastructure 103 may be deemed to be similar to the compromised infrastructure 103. Machine learning or commercially-available geospatial analytics service (e.g., Descartes Labs geospatial analysis service) may be employed to detect similar satellite images. The degree of similarity between two satellite images depends on the algorithm or service. Two satellite images may be deemed to be similar when the service or satellite comparison algorithm (e.g., by similarity score) employed so indicates.

In one embodiment, infrastructures in the set 231 that have network fingerprints and/or satellite images that are similar to those of the compromised infrastructure 103 are deemed to be similar to the compromised infrastructure 103. Although network fingerprint comparison provides an indication of similarity of infrastructures, satellite image comparison verifies that the infrastructures are indeed similar. In the example of FIG. 2, the infrastructures 104, 105, and 106 are geographically proximate to the compromised infrastructure 103 (i.e., included in the set 231) and have been found to be similar to the compromised infrastructure 103. The infrastructures 104, 105, and 106 may thus be deemed to have a same industrial purpose as the compromised infrastructure 103. In response, IT personnel of the infrastructures 104, 105, and 106 may be alerted of a possible cyberattack.

Figure 3:
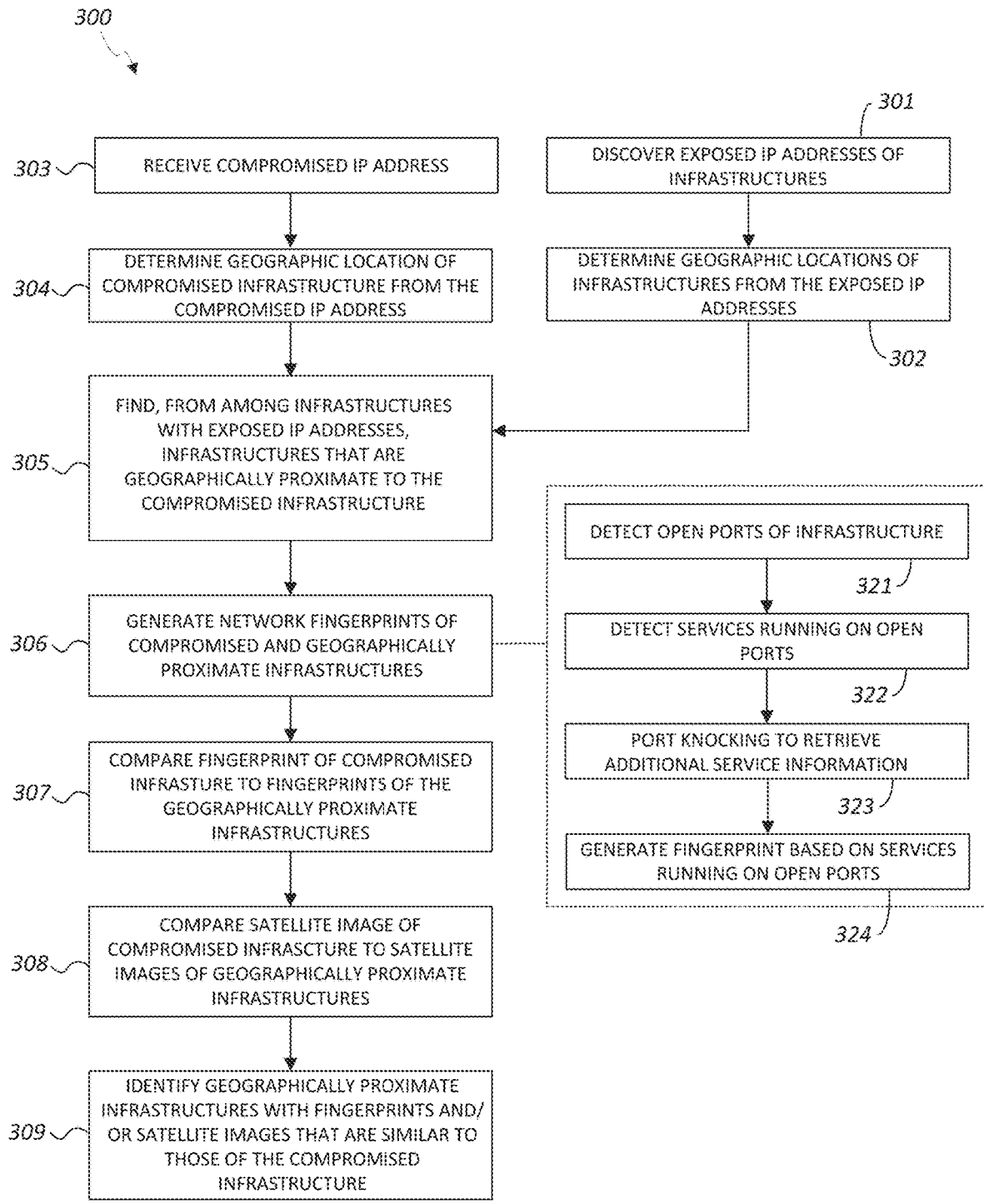
FIG. 3 shows a flow diagram of a method of identifying similar geographically proximate infrastructures in accordance with an embodiment of the present invention.

FIG. 3 shows a flow diagram of a method 300 of identifying similar geographically proximate infrastructures in accordance with an embodiment of the present invention. The method 300 may be performed using the system of FIG. 1. As can be appreciated, other systems or components may also be employed without detracting from the merits of the present invention.

In the example of FIG. 3, exposed IP addresses of a plurality of infrastructures are discovered (step 301). The geographic locations of the plurality of infrastructures are determined from their respective exposed IP addresses (step 302). A compromised IP address of a compromised infrastructure is received (step 303). The geographic location of the compromised infrastructure is determined from the compromised IP address (step 304). The geographic locations of the plurality of infrastructures with exposed IP addresses are compared to the geographic location of the compromised infrastructure to find, from among the plurality of infrastructures with exposed IP addresses, infrastructures that are geographically proximate to the compromised infrastructure (step 305).

The network fingerprints of the compromised infrastructure and geographically proximate infrastructures are generated (step 306). In one embodiment, a network fingerprint of an infrastructure is generated by detecting open ports of the infrastructure (step 321), detecting network services running on the open ports (step 322), performing port knocking to retrieve additional network service information (step 323), and generating the network fingerprint based on network services running on the open ports (step 324).

The network fingerprint of the compromised infrastructure is compared against network fingerprints of the geographically proximate infrastructures (step 307). The satellite image of the compromised infrastructure is compared against satellite images of the geographically proximate infrastructures (step 308). Geographically proximate infrastructures that have fingerprints and/or satellite images that are similar to those of the compromised infrastructure are identified (step 309). The identified infrastructures are deemed to be similar to the compromised infrastructure, and may thus be deemed to have the same industrial purpose as the compromised infrastructure. An alert may be sent to the identified infrastructures, with the alert indicating that a cyberattack has been launched against an infrastructure of a same industry as the identified infrastructures. The alert may be a visual indicator or message displayed on a display screen, an email message, or other message or signal that can reach IT personnel of the identified infrastructures.

Figure 4:
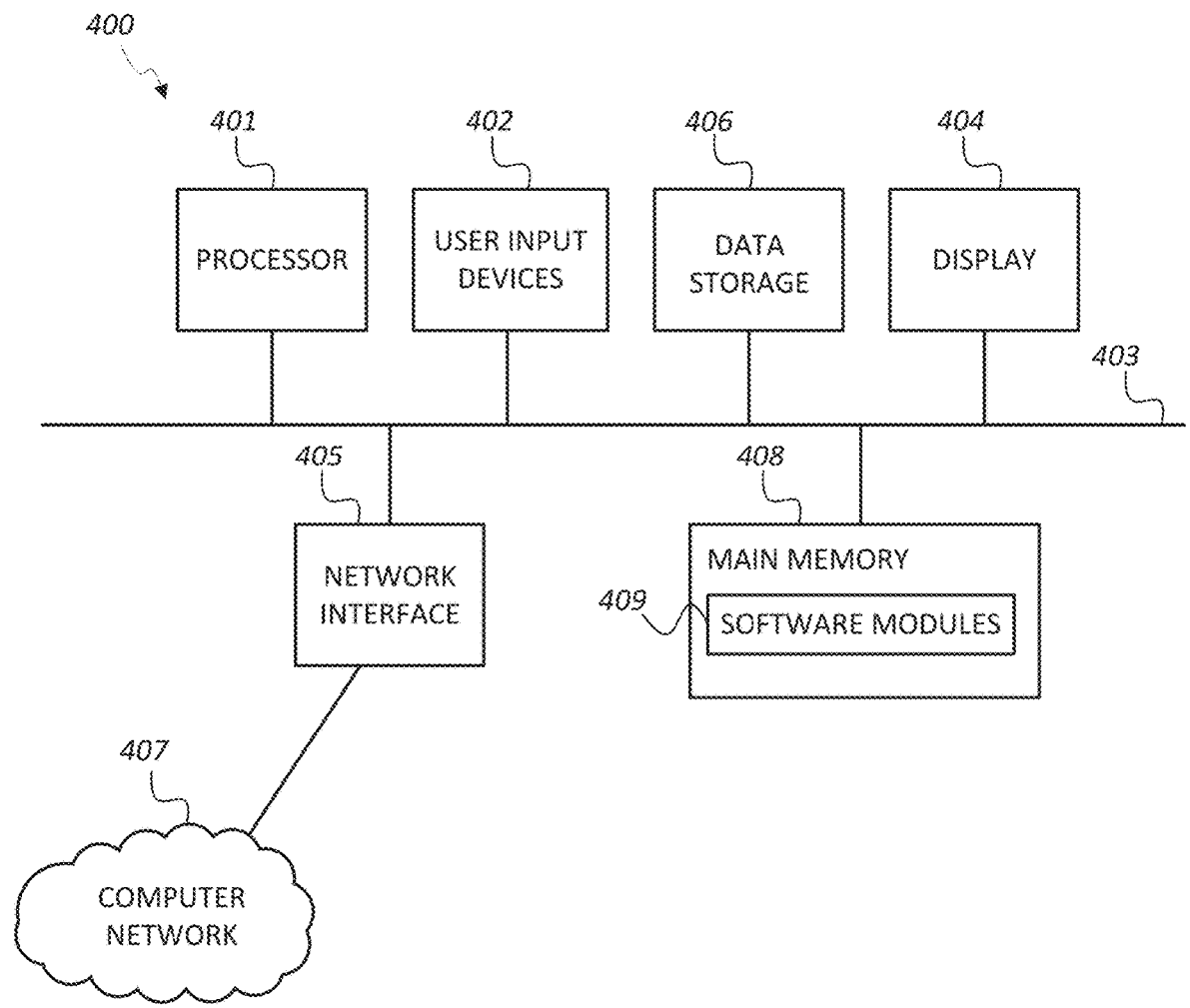
FIG. 4 shows a block diagram of a computer system that may be employed with embodiments of the present invention.

Referring now to FIG. 4, there is shown a block diagram of a computer system 400 that may be employed with embodiments of the present invention. The computer system 400 may be employed as a cybersecurity platform or other computer described herein. The computer system 400 may have fewer or more components to meet the needs of a particular cybersecurity application. The computer system 400 may include one or more processors 401. The computer system 400 may have one or more buses 403 coupling its various components. The computer system 400 may include one or more user input devices 402 (e.g., keyboard, mouse), one or more data storage devices 406 (e.g., hard drive, optical disk, solid state drive), a display screen 404 (e.g., liquid crystal display, flat panel monitor), a computer network interface 405 (e.g., network adapter, modem), and a main memory 408 (e.g., random access memory). The computer network interface 405 may be coupled to a computer network 407, which in this example includes the Internet.

The computer system 400 is a particular machine as programmed with one or more software modules 409, comprising instructions stored non-transitory in the main memory 408 for execution by the processor 401 to cause the computer system 400 to perform corresponding programmed steps. An article of manufacture may be embodied as computer-readable storage medium including instructions that when executed by the processor 401 cause the computer system 400 to be operable to perform the functions of the one or more software modules 409.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying similar geographically proximate infrastructures, the method comprising:
   discovering exposed Internet protocol (IP) addresses of a plurality of infrastructures that have devices that are accessible from the Internet;
   determining, from the exposed IP addresses, geographic locations of the plurality of infrastructures;
   receiving a compromised IP address of a compromised infrastructure, wherein the compromised infrastructure has been cyberattacked or is vulnerable to a cyberattack;
   determining, from the compromised IP address, a geographic location of the compromised infrastructure;
   identifying geographically proximate infrastructures from among the plurality of infrastructures, the geographically proximate infrastructures having geographic locations that are within a predetermined distance of the geographic location of the compromised infrastructure;
   identifying similar geographically proximate infrastructures from among the geographically proximate infrastructures, the similar geographically proximate infrastructures having a same industrial purpose as the compromised infrastructure; and
   sending an alert to the similar geographically proximate infrastructures.

2. The method of claim 1, further comprising:
   generating network fingerprints of the compromised infrastructure and the geographically proximate infrastructures; and
   comparing the network fingerprint of the compromised infrastructure against the network fingerprints of the geographically proximate infrastructures,
   wherein the similar geographically proximate infrastructures are identified based at least on the comparison of the network fingerprint of the compromised infrastructure against the network fingerprints of the geographically proximate infrastructures.

3. The method of claim 2, further comprising:
   comparing a satellite image of the compromised infrastructure against satellite images of the geographically proximate infrastructures,
   wherein the similar geographically proximate infrastructures are identified based at least on the comparison of the satellite image of the compromised infrastructure against the satellite images of the geographically proximate infrastructures.

4. The method of claim 2, wherein generating the network fingerprints of the compromised infrastructure and the geographically proximate infrastructures comprises:
   detecting open ports of devices of the compromised infrastructure and the geographically proximate infrastructures;
   detecting network services running on the open ports; and
   generating the network fingerprints of the compromised infrastructure and the geographically proximate infrastructures based at least on network services detected to be running on the open ports.

5. The method of claim 1, wherein the alert indicates that a cyberattack has been launched against an infrastructure of a same industry as the similar geographically proximate infrastructures.

6. The method of claim 1, wherein the compromised infrastructure and the similar geographically proximate infrastructures are critical infrastructures.

7. The method of claim 6, wherein the compromised infrastructure and the similar geographically proximate infrastructures are power generation plants.

8. A computer system comprising at least one processor and a memory, the memory storing instructions that when executed by the at least one processor cause the computer system to:
   receive a compromised Internet protocol (IP) address of a compromised infrastructure, wherein the compromised infrastructure has been cyberattacked or is vulnerable to a cyberattack;
   determine, from the compromised IP address, a geographic location of the compromised infrastructure;
   identify geographically proximate infrastructures from among a plurality of infrastructures that have devices that are accessible from the Internet, the geographically proximate infrastructures having geographic locations that are within a predetermined distance of the geographic location of the compromised infrastructure;
   identify similar geographically proximate infrastructures from among the geographically proximate infrastructures, the similar geographically proximate infrastructures having network fingerprints that are similar to those of the compromised infrastructure; and
   send an alert to the similar geographically proximate infrastructures.

9. The computer system of claim 8, wherein the similar geographically proximate infrastructures have satellite images that are similar to a satellite image of the compromised infrastructure.

10. The computer system of claim 8, wherein the alert is displayed on a display screen.

11. The computer system of claim 8, wherein the instructions stored in the memory, when executed by the at least one processor, cause the computer system to:
    generate network fingerprints of the compromised infrastructure and the geographically proximate infrastructures.

12. The computer system of claim 11, wherein the instructions stored in the memory, when executed by the at least one processor, cause the computer system to generate the network fingerprints of the compromised infrastructure and the geographically proximate infrastructures by:
    detecting open ports of the compromised infrastructure and the geographically proximate infrastructures;

detecting network services that are running on the open ports; and generating the network fingerprints of the compromised infrastructure and the geographically proximate infrastructures based at least on the network services that are running on the open ports.

13. The computer system of claim 8, wherein the instructions stored in the memory, when executed by the at least one processor, cause the computer system to determine, from the compromised IP address, the geographic location of the compromised infrastructure by:

providing the compromised IP address to a geolocation service; and receiving the geographic location of the compromised infrastructure from the geolocation service.

14. The computer system of claim 8, wherein the instructions stored in the memory, when executed by the at least one processor, cause the computer system to:

receive exposed IP addresses of the plurality of infrastructures from a device discovery service;

provide the exposed IP addresses to a geolocation service; and receive geographic locations of the plurality of infrastructures from the geolocation service.

15. A method of identifying similar geographically proximate infrastructures, the method comprising:

receiving a compromised Internet protocol (IP) address of a compromised infrastructure, wherein the compromised infrastructure has been cyberattacked or is vulnerable to a cyberattack;

determining, from the compromised IP address, a geographic location of the compromised infrastructure;

identifying geographically proximate infrastructures from among a plurality of infrastructures that have devices that are accessible from the Internet, the geographically proximate infrastructures having geographic locations that are within a predetermined distance of the geographic location of the compromised infrastructure;

identifying similar geographically proximate infrastructures from among the geographically proximate infrastructures, the similar geographically proximate infrastructures having a same industrial purpose as the compromised infrastructure; and sending an alert to the similar geographically proximate infrastructures.

16. The method of claim 15, further comprising:

generating network fingerprints of the compromised infrastructure and the geographically proximate infrastructures; and comparing the network fingerprint of the compromised infrastructure against the network fingerprints of the geographically proximate infrastructures, wherein the similar geographically proximate infrastructures are identified based at least on the comparison of the network fingerprint of the compromised infrastructure against the network fingerprints of the geographically proximate infrastructures.

17. The method of claim 16, further comprising:

comparing a satellite image of the compromised infrastructure against satellite images of the geographically proximate infrastructures, wherein the similar geographically proximate infrastructures are identified based at least on the comparison of the satellite image of the compromised infrastructure against the satellite images of the geographically proximate infrastructures.

18. The method of claim 16, wherein generating the network fingerprints of the compromised infrastructure and the geographically proximate infrastructures comprises:

detecting open ports of the compromised infrastructure and the geographically proximate infrastructures;

detecting network services that are running on the open ports; and generating the network fingerprints of the compromised infrastructure and the geographically proximate infrastructures based at least on the network services that are running on the open ports.

19. The method of claim 15, further comprising:

discovering exposed IP addresses of the plurality of infrastructures;

determining, from the exposed IP addresses, geographic locations of the plurality of infrastructures; and identifying the geographically proximate infrastructures by comparing the geographic location of the compromised infrastructure to the geographic locations of the plurality of infrastructures.

* * * * *